US006681158B2

(12) United States Patent
Griffith et al.

(10) Patent No.: US 6,681,158 B2
(45) Date of Patent: Jan. 20, 2004

(54) UNINTERRUPTABLE ADS-B SYSTEM FOR AIRCRAFT TRACKING

(75) Inventors: Emmett Griffith, Salem, OR (US); Craig Hudson, Amity, OR (US); Thomas Lee Mosher, Salem, OR (US)

(73) Assignee: Garmin AT, Inc., Salem, OR (US)

( * ) Notice: Subject to any disclaimer, the term of this patent is extended or adjusted under 35 U.S.C. 154(b) by 0 days.

(21) Appl. No.: 10/251,220

(22) Filed: Sep. 19, 2002

(65) Prior Publication Data

US 2003/0060941 A1 Mar. 27, 2003

Related U.S. Application Data

(60) Provisional application No. 60/324,169, filed on Sep. 21, 2001.

(51) Int. Cl.$^7$ .............................. G06F 19/00; G08G 5/00
(52) U.S. Cl. ............................... 701/3; 701/9; 701/120; 340/5.73; 348/143
(58) Field of Search .............................. 701/3, 4, 9, 10, 701/14, 120; 342/30, 36, 357.09; 348/116, 117, 143, 148, 149; 370/961, 5.2, 5.31, 5.73, 5.61, 5.64, 945, 963; 244/118.5, 129.5

(56) References Cited

U.S. PATENT DOCUMENTS

| | | | | |
|---|---|---|---|---|
| 3,704,845 A | * | 12/1972 | Ord .............................. 244/121 |
| 4,167,733 A | * | 9/1979 | Krause et al. .............. 340/539 |
| 4,644,494 A | * | 2/1987 | Muller ........................ 711/152 |
| 5,159,344 A | | 10/1992 | Robinson et al. ............. 342/44 |
| 5,381,140 A | | 1/1995 | Kuroda et al. .............. 340/961 |
| 5,570,095 A | | 10/1996 | Drouilhet, Jr. et al. . 342/357.07 |
| 5,708,565 A | | 1/1998 | Fairbanks .................... 361/704 |
| 5,714,948 A | | 2/1998 | Farmakis et al. ........... 340/961 |
| 5,890,079 A | | 3/1999 | Levine ........................ 701/14 |
| 6,009,356 A | * | 12/1999 | Monroe ........................ 701/14 |
| 6,092,008 A | | 7/2000 | Bateman ...................... 701/14 |
| 6,124,825 A | | 9/2000 | Eschenbach ............ 342/357.08 |
| 6,308,045 B1 | * | 10/2001 | Wright et al. ................. 455/66 |
| 6,385,513 B1 | * | 5/2002 | Murray et al. ................ 701/14 |
| 6,459,411 B2 | * | 10/2002 | Frazier et al. .............. 342/455 |
| 6,469,660 B1 | * | 10/2002 | Horvath et al. ............. 342/179 |
| 6,474,599 B1 | * | 11/2002 | Stomski .................. 244/118.5 |
| 2002/0004695 A1 | | 1/2002 | Glenn et al. .................. 701/35 |

FOREIGN PATENT DOCUMENTS

DE    19903099    8/2000

OTHER PUBLICATIONS

Hicok et al., "Application of ADS–B for Aircraft Surface Surveillance", IEEE Nov. 1998, pp. F34–1 to F34–8.*
International Search Report from corresponding International Application No. PCT/US02/29945 dated Jan. 7, 2003.

* cited by examiner

Primary Examiner—Tan Q. Nguyen
(74) Attorney, Agent, or Firm—Devon A. Rolf

(57) ABSTRACT

An aircraft surveillance system that includes an uninterruptible aircraft information broadcasting system (such as an ADS-B system) for transmitting flight information from an aircraft, and one or more ground stations for receiving the broadcast flight information. The flight information preferably includes the aircraft's aircraft ID, current three-dimensional position, and intended path. Optional components according to the invention include a system and method for validating messages received from the aircraft, and an alternative system and method for determining the aircraft's position if a primary navigation aid, such as GPS, is not available. In one embodiment of the invention, the system includes a transmitter and an uninterruptible power supply that are disposed within a secure housing within the aircraft. This serves to prevent passengers and crew members from disabling the system.

64 Claims, 6 Drawing Sheets

UNINTERRUPTABLE ADS-B SYSTEM FOR AIRCRAFT TRACKING

CROSS REFERENCE TO RELATED APPLICATION

This application claims the benefit of U.S. Provisional Application Serial No. 60/324,169, which was filed Sep. 21, 2001 and entitled "Uninterruptible ADS-B System for Aircraft Tracking", and which is incorporated herein by reference.

FIELD OF THE INVENTION

This invention relates generally to aircraft surveillance systems, and more particularly to secure aircraft surveillance systems that are configured for alerting air traffic controllers if an aircraft departs substantially from an expected flight path or pattern of behavior.

BACKGROUND OF THE INVENTION

The terrorist hijacking and suicide crashes of four U.S. civilian airliners on Sep. 11, 2001, were tragic and unforeseen. The inability of the air traffic control and civil defense infrastructure to respond effectively to the situation as it developed was due, in part, to limitations of the current radar-based surveillance infrastructure.

Because of timing delays and accuracy limitations inherent in the design of current radar-based air traffic control systems, controllers are unable to determine the real-time intent of aircraft they are tracking. Moreover, current radar surveillance systems depend on transponder responses from the aircraft to operate at maximum efficiency. The September 11 terrorists disabled or turned off some aircraft transponders in the cockpit of the hijacked aircraft, making it difficult to track the aircraft. This, combined with the limitations of current surveillance radar systems, made it nearly impossible for controllers to realize that three of the aircraft had turned into collision courses with ground targets.

Thus, there is a need for an aircraft surveillance system that cannot be interrupted by unauthorized persons. There is a further need for an improved surveillance system that is configured to warn ground controllers when an aircraft acts outside of cleared parameters. Furthermore, there is a need for systems that alert ground controllers if someone in the aircraft is attempting to send a false signal to deceive the controllers into believing that the aircraft is following a planned course when in fact it has been diverted. In addition, there is a need for an improved surveillance system that allows pilots to quickly and reliably issue a distress signal upon realizing that their aircraft is in danger of being hijacked.

SUMMARY OF THE INVENTION

The present invention meets the objectives set forth above by providing an on-board broadcast surveillance system and method that cannot be interrupted and that provides three-dimensional position information to ground or airborne controllers via a data transmitter. Optionally, the broadcast information may include the Ownship aircraft's aircraft ID and intended path. Other optional components according to the invention include a system and method for validating messages received from the aircraft, and an alternative system and method for determining the aircraft's position if a primary navigation aid, such as the Global Positioning System ("GPS"), is not available.

In a preferred embodiment, the invention equips an aircraft with a small uninterruptible Universal Access Transceiver/Automatic Dependent Surveillance—Broadcast ("UAT/ADS-B") transmitter (or other suitable transmitter) that is capable of broadcasting aircraft ID, three-dimensional position and aircraft intent. The device contains an internal GPS receiver to determine aircraft position and has an uninterruptible power supply that can not be disabled from the cockpit. The device, which is preferably located in the aircraft's equipment bay, automatically begins broadcasting aircraft position, ID and intent the moment the aircraft is powered up and continues to broadcast that information, in real-time, until the aircraft is on the ground and shut down. Via an optional external interface, the device may receive and broadcast flight plan information from the on-board flight management computer. Such information is then made available for comparison to originally filed ATC flight plan data. This allows air traffic control ("ATC") authorities to detect any inappropriate changes to the aircraft's intended destination shortly after the changes are entered into the aircraft's flight management computer.

The invention may further provide a ground infrastructure that preferably comprises a plurality of receivers for receiving the information transmitted from the aircraft. Preferably, about 600 low-cost UAT ADS-B receivers would be located throughout the continental United States to provide full CONUS real-time surveillance. The system would be equipped with the capability of determining whether the equipped aircraft were flying within the "normal" parameters of its flight plan. Upon detecting a deviation from the flight plan, the system would provide controllers and civil defense authorities with an immediate alert. If an aircraft deviated from its flight plan, its ADS-B signal would continue to provide real-time position, altitude, heading and intent of the aircraft to air traffic control and civil defense authorities. Airborne controller stations may optionally replace some or all ground controller stations.

A system and method for validating messages received from the aircraft may be based on the ability of the UAT to perform range measurements based on signal propagation time, giving rise to several advantages. More specifically, the system can determine whether the aircraft's reported position (i.e., the position transmitted by the aircraft) is valid by comparing a range that corresponds to the target's reported position with a range derived from signal propagation times. As an additional validity check, or if GPS service is unavailable, the position of a particular aircraft can be determined by receiving at least a partial State Vector (identity plus altitude) at multiple controller stations, and then using time of reception differentials among a network of such stations to compute lines of position.

Additional anti-spoofing can be accomplished by validating the last received position information with a dead reckoning algorithm. When implementing this functionality, any jumps in speed and velocity outside a preset limit are rejected.

In the event that GPS position information becomes unavailable, a dead reckoning function can be used to estimate the aircraft's position. Inexpensive inputs such as heading from a magnetic flux gate, changes in velocity from a solid state accelerometer, and altitude from an optional self-contained barometer can also be used to enhance the dead reckoning calculation. As will be understood by one skilled in the art, this self-contained barometer is optional because the aircraft is preferably equipped with an altimeter that is not affected by any loss of GPS position information.

The invention may further include a panic button within the cockpit of the aircraft that, when activated, transmits a signal to an aircraft information broadcasting system indicating that the Ownship aircraft is in danger of being hijacked. The aircraft information broadcasting system then immediately transmits a signal that triggers an appropriate alarm at a ground station. This aspect of the system is advantageous because it allows pilots to issue a distress signal without having to enter a complex code. Also, in a preferred embodiment of the invention, the aircraft information broadcasting system is preferably tamper-proof and located outside the aircraft's cockpit. As a result, it is unlikely that a hijacker would be able to disable the aircraft information broadcasting system before the pilot transmits a distress signal to air traffic control.

More particularly, a system according to a preferred embodiment of the invention comprises a housing defining an interior portion and an aircraft information broadcasting system that is disposed within the interior portion of the housing. In this embodiment of the invention, the system is configured for broadcasting flight-related information that is related to the Ownship aircraft's current flight. The housing is configured for restricting access to the aircraft information broadcasting system while the aircraft is in flight.

In one embodiment of the invention, the system is configured for broadcasting the flight-related information in real time and in a substantially continuous manner while the aircraft is in flight. In a particular embodiment of the invention, the flight-related information includes one or more of the following: (1) the aircraft's current flight ID, (2) the current three-dimensional position of the aircraft, (3) the aircraft's current velocity, (4) waypoint information for the aircraft; and (5) the aircraft's current intent information.

In another embodiment of the invention, the system's housing comprises a robust material that substantially surrounds the aircraft information broadcasting system and that thereby restricts access to the aircraft information broadcasting system. In a particular embodiment of the invention, this housing is configured to be locked while the aircraft is in flight. In one embodiment of the invention, the housing and the aircraft information broadcasting system are configured for being disposed within a portion of the aircraft that is outside of the aircraft's cockpit while the aircraft is in flight. The aircraft information broadcasting system is preferably located within the aircraft's equipment bay.

In yet another embodiment of the invention, the system comprises an information reception and analysis station that is configured for comparing intent information that is broadcast from the aircraft's aircraft information broadcasting system with approved flight path information to determine whether the aircraft is being directed toward an improper destination. In this embodiment of the invention, the system is preferably configured for generating an alarm if the intent information differs from the approved flight path information by more than a predetermined amount.

In a further embodiment of the invention, the system comprises an information reception and analysis station that is configured to validate information received from the aircraft information broadcasting system using triangulation techniques. Similarly, the system is preferably configured for generating an alarm if one or more measured aspects of the aircraft's current flight differs from the expected or measured flight characteristics of the aircraft.

An additional embodiment of the invention comprises a method of broadcasting information related to an aircraft. This method comprises the steps of: (1) providing a housing that defines an interior portion and that is configured for restricting access to the housing's interior portion while the aircraft is in flight; (2) providing an aircraft information broadcasting system that is configured for broadcasting flight-related information from the aircraft; (3) positioning the aircraft information broadcasting system within the interior portion of the housing; and (4) using the aircraft information broadcasting system to broadcast the flight-related information from the aircraft while the aircraft information broadcasting system is disposed within the interior portion of the housing and while the housing is restricting access to the interior portion.

Yet another embodiment of the invention comprises a method of tracking an aircraft. This method comprises the step of providing an aircraft with an information broadcasting system that is configured for broadcasting information related to a current flight of the aircraft in a substantially uninterruptible manner while the aircraft is in flight.

The invention described above is expressed in terms of systems and methods that are configured for executing, or that include, various steps. However, it will be understood by one skilled in the art that the invention also includes systems that are configured to perform, and computer-readable media that include computer-executable instructions for executing, the steps included within the above-described methods. Similarly, one skilled in the art will understand that the invention also includes methods that include, and computer-readable media that include computer-executable instructions for executing, the steps executed by the above-described systems.

BRIEF DESCRIPTION OF THE DRAWINGS

Figure 1:
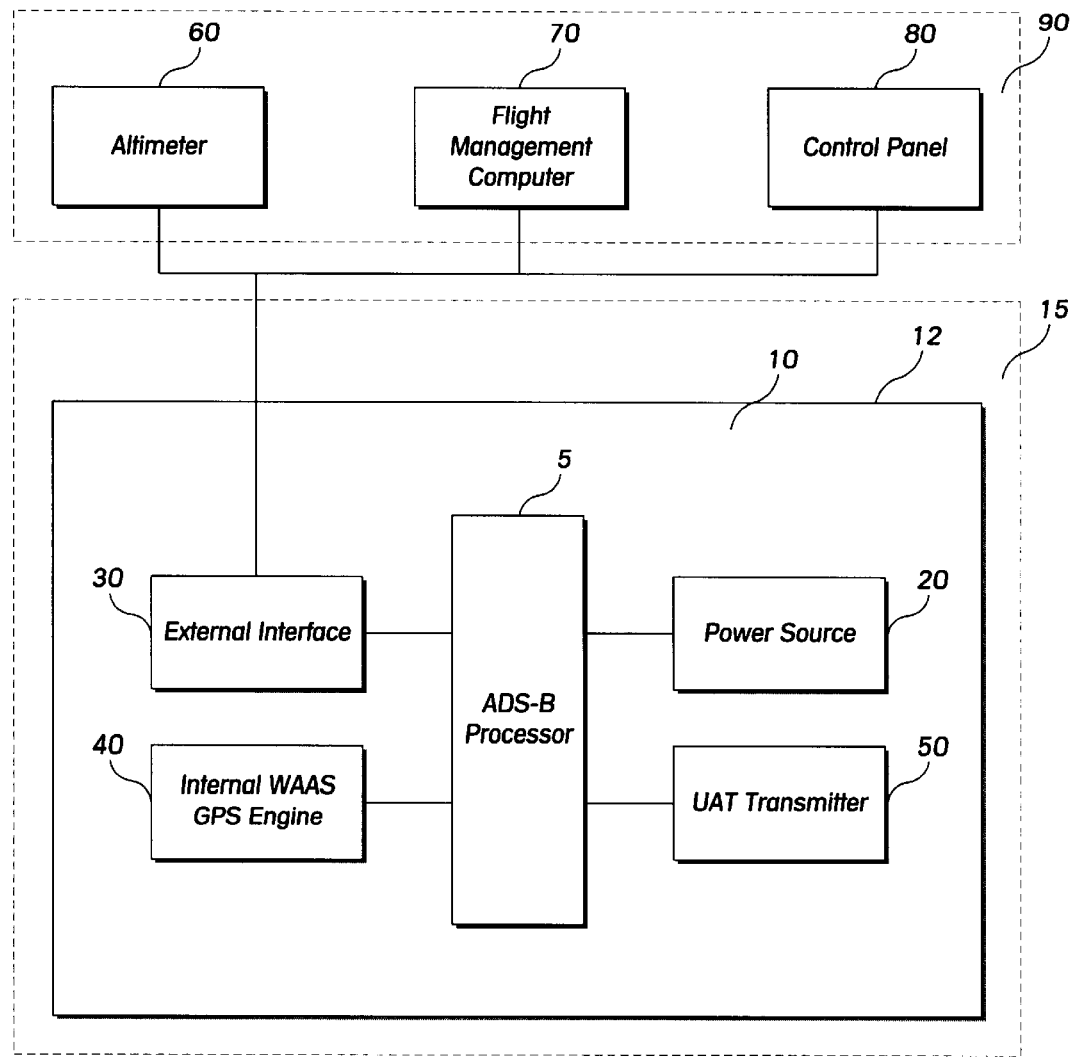

Having thus described the invention in general terms, reference will now be made to the accompanying drawings, which are not necessarily drawn to scale, and wherein:

FIG. 1 is a block diagram of an aircraft information broadcasting system according to a preferred embodiment of the present invention. This figure depicts the interface between the aircraft information broadcasting system and various external sources of information.

Figure 2:
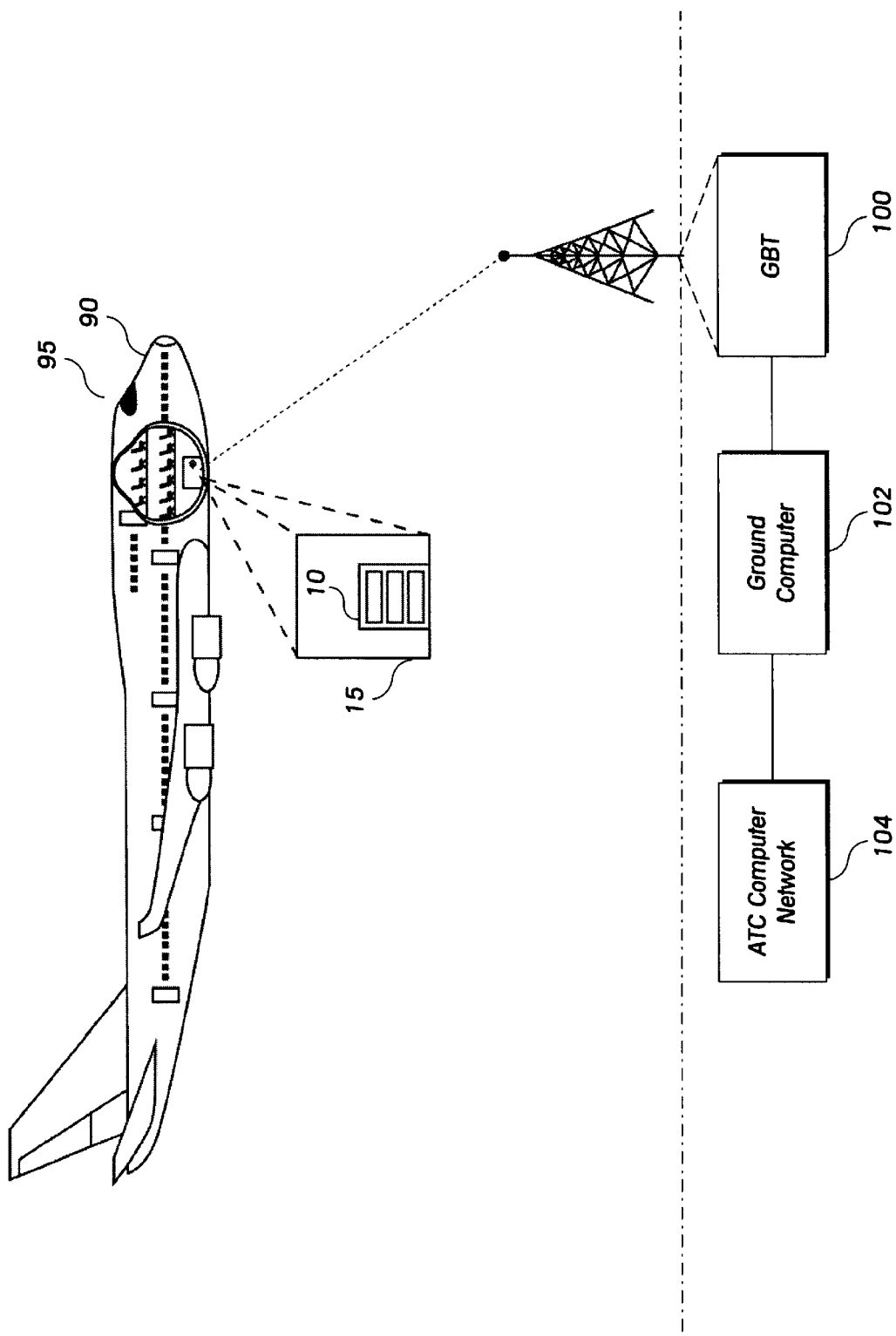

FIG. 2 is a block diagram of an aircraft surveillance system according to a preferred embodiment of the invention.

Figure 3A:
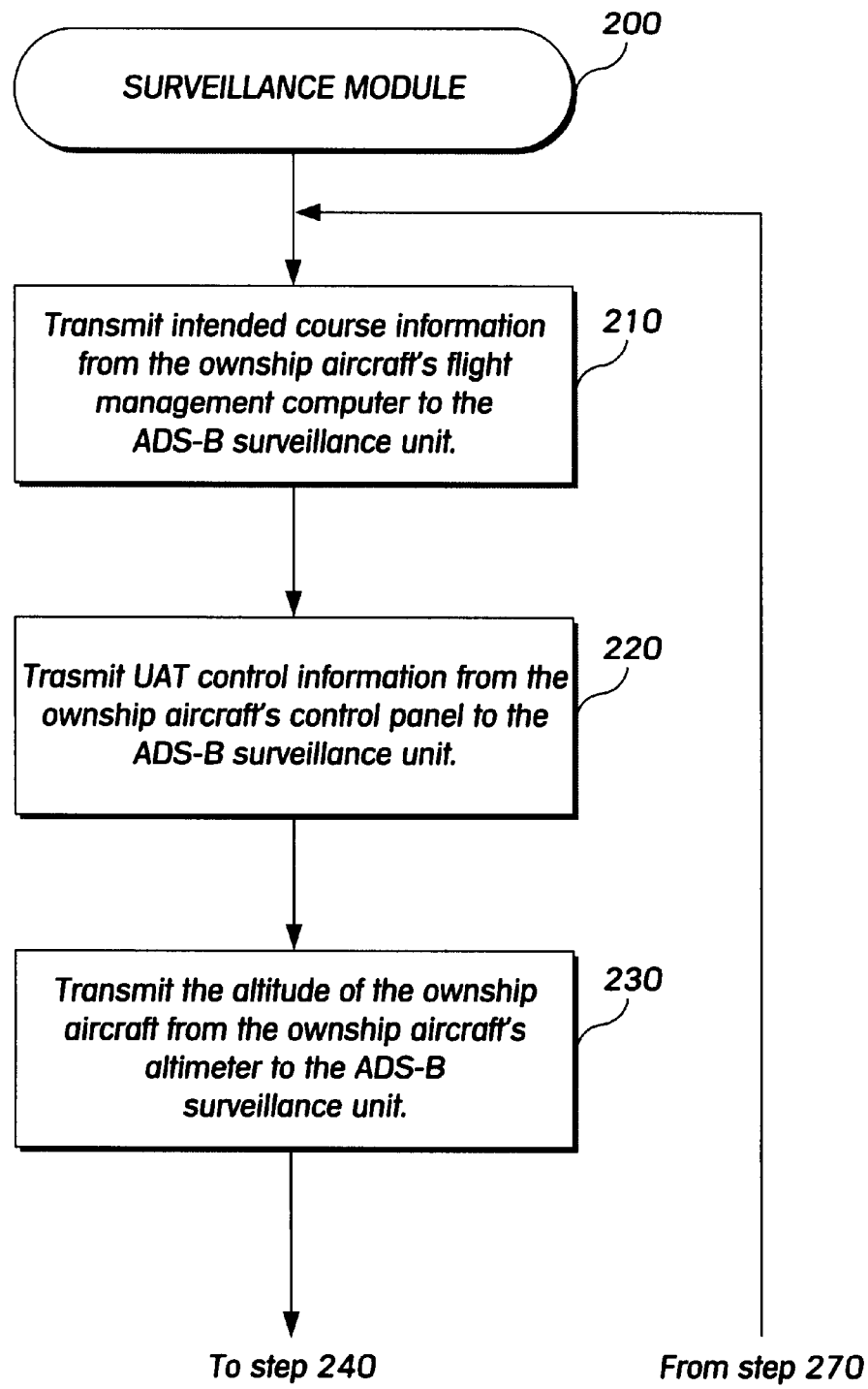
Figure 3B:
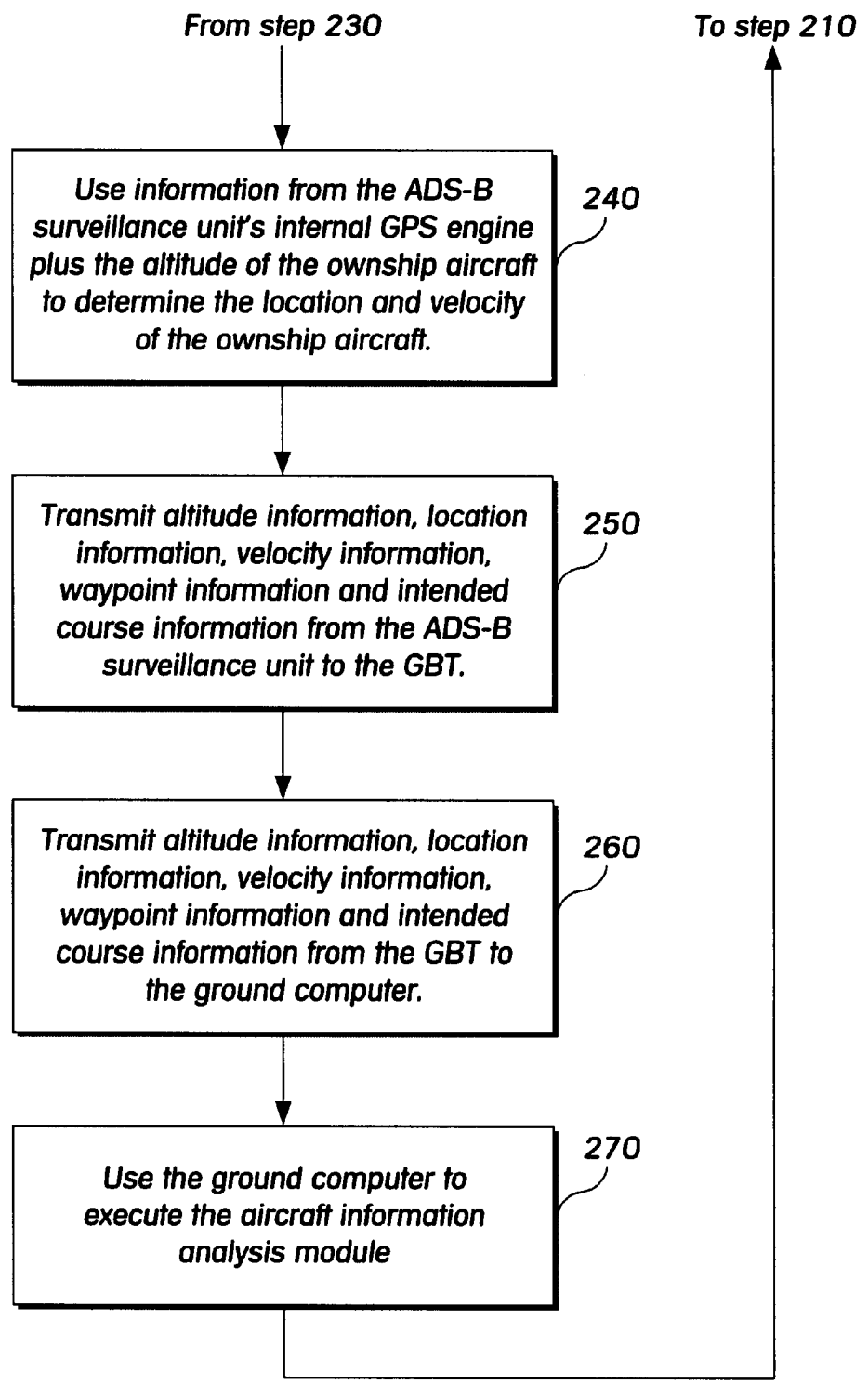

FIGS. 3A and 3B depict a flowchart that generally illustrates a surveillance module according to the current invention.

Figure 4:
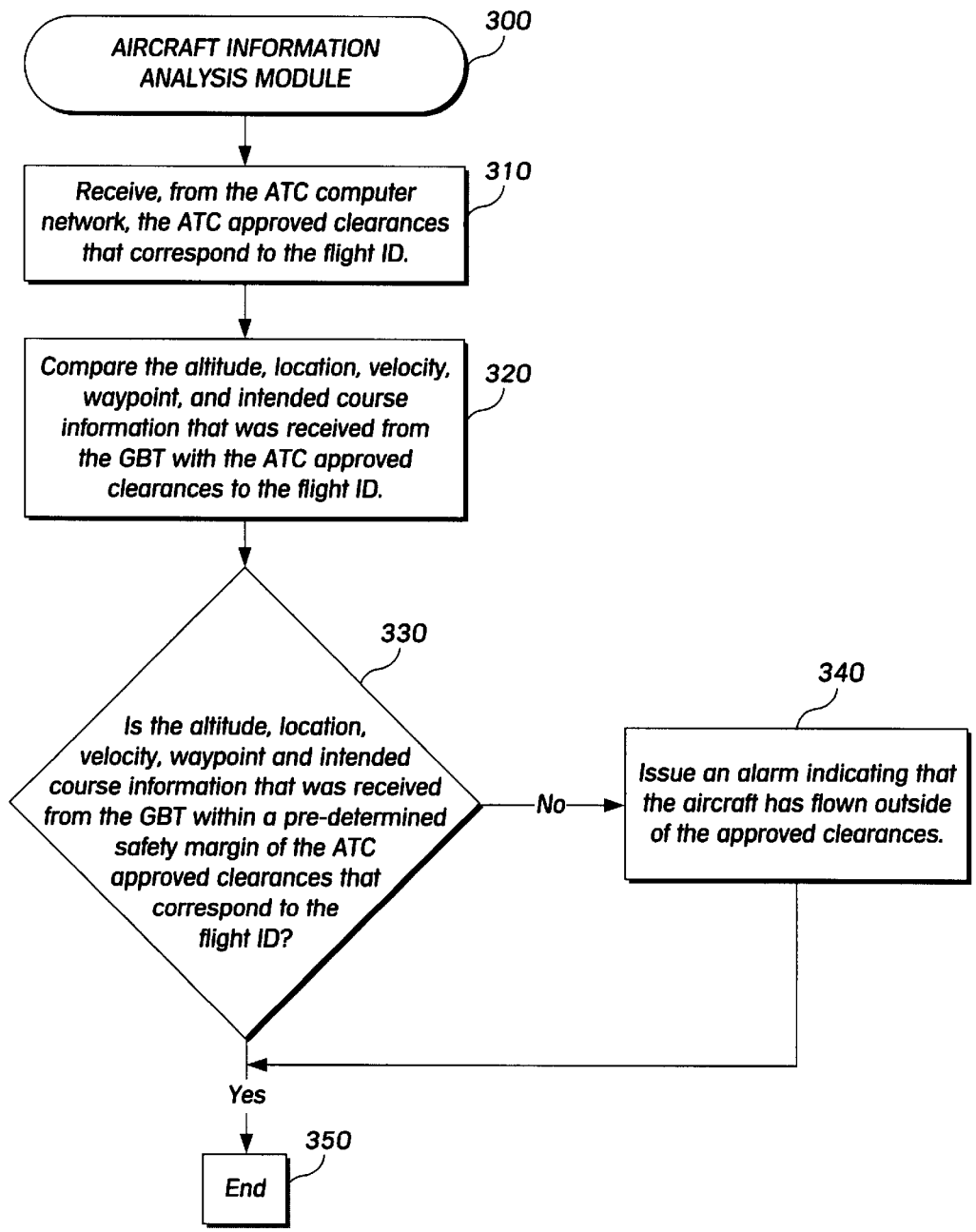

FIG. 4 depicts a flowchart that generally illustrates an aircraft information analysis module according to the current invention.

Figure 5:
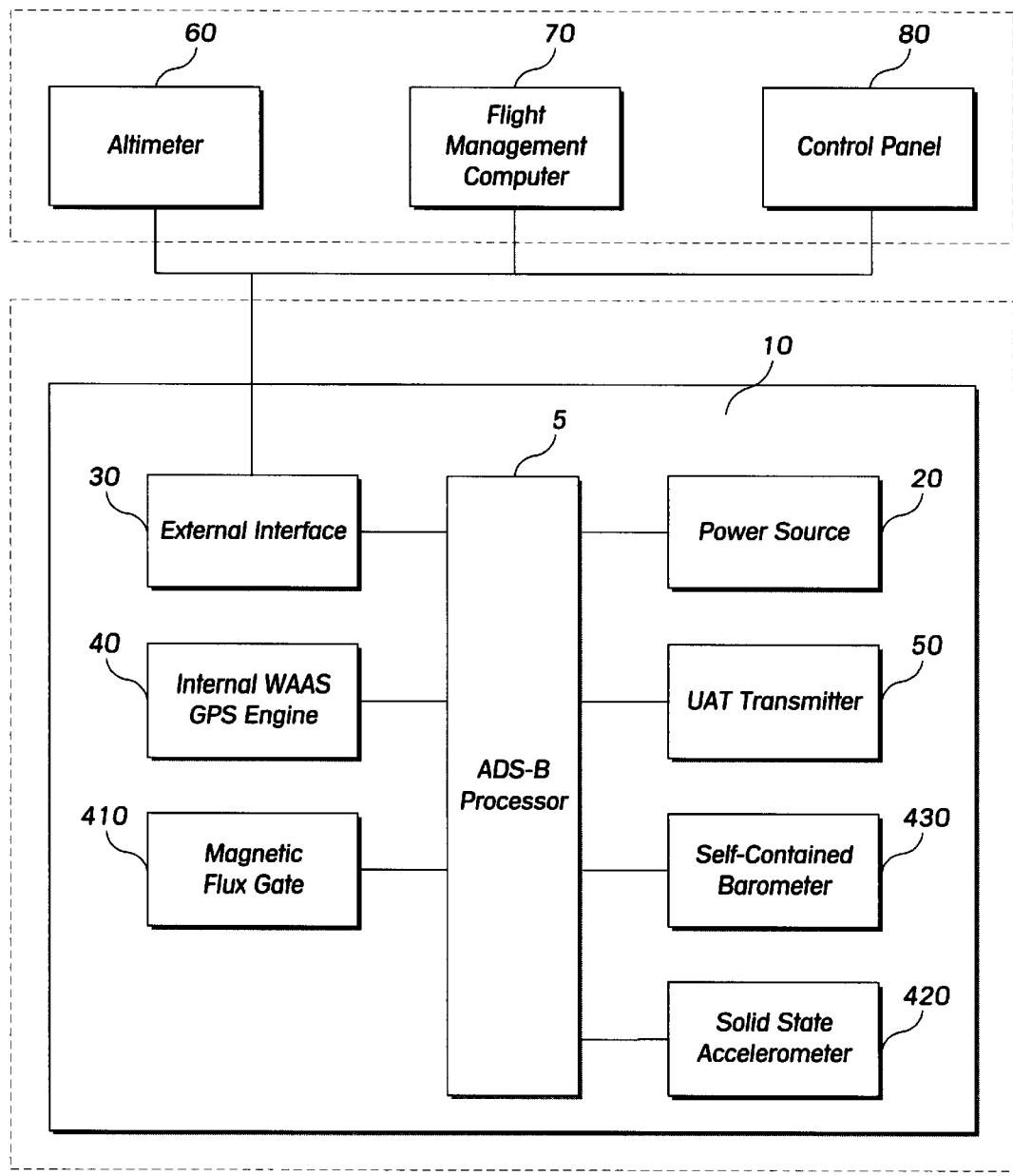

FIG. 5 is a block diagram of an aircraft information broadcasting system according to an alternative embodiment of the present invention. Like FIG. 1, this figure depicts the interface between the aircraft information broadcasting system and various external sources of information.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

The present invention provides an aircraft surveillance system that allows air traffic control and civil defense to track aircraft. In one embodiment of the invention, the system continuously transmits aircraft flight information to a computer (e.g., a ground-based "ground computer") that compares current flight information with approved clearances. In a preferred embodiment of the invention, the system transmits this flight information in ADS-B format based on GPS position information. If the flight characteristics of the Ownship aircraft are outside of approved clearances, the system issues an alert to air traffic control and civil defense authorities, which can then act quickly to prevent the aircraft from being used for destructive purposes. As discussed in more detail below, one embodiment of this system is tamper-proof and is positioned in the equipment bay of the aircraft so that potential hijackers can not shut down or otherwise hinder the operation of the aircraft surveillance system. The system also preferably includes anti-spoofing functionality, and the capability to function even when GPS service is unavailable. The structure and operation of the system are discussed in greater detail below.

General Structure of the Aircraft Surveillance System

In one embodiment of invention, an Ownship Aircraft 95, shown in FIG. 2, is outfitted with a small, robust aircraft information broadcasting system 10 that is configured for continuously transmitting aircraft flight information, preferably in real-time, while the aircraft is in flight. As shown in FIG. 1, this aircraft information broadcasting system 10 preferably comprises a power source 20, an external interface 30, an internal WAAS GPS Engine 40, a UAT Transmitter 50, and an ADS-B processor 5. These components are preferably housed within a sturdy, tamperproof housing 12 (such as a steel or strong plastic housing) that may be locked during flight to prevent hijackers from tampering with the aircraft information broadcasting system 10. In addition, as shown in FIG. 2, the aircraft information broadcasting system 10 is preferably stored within the equipment bay 15 of the Ownship aircraft 95 so that the aircraft information broadcasting system 10 may not easily be accessed during flight. The structure and functionality of the power source 20, external interface 30, internal GPS Engine 40, UAT Transmitter 50, and ADS-B Processor 5 are discussed in greater detail below.

The Power Source

To prevent hijackers from disabling the aircraft information broadcasting system 10 during flight, the aircraft information broadcasting system 10 is preferably equipped with a backup power source 20 that is independent of the aircraft information broadcasting system's 10 primary power source (which is not shown and which may be, for example, the aircraft's power bus). In a preferred embodiment of the invention, this backup power source 20 is a rechargeable battery that is automatically charged by the aircraft's primary power source. This allows the aircraft information broadcasting system 10 to operate without interruption even if power is no longer available from the aircraft information broadcasting system's primary power source.

The External Interface

As may be understood from FIG. 1, the aircraft information broadcasting system 10 is equipped with an external interface 30 for receiving information from various optional external navigational components within the Ownship aircraft. For example, in one embodiment of the invention, the external interface 30 is connected to the Ownship aircraft's altimeter 60, flight management computer 70, and control panel 80. In a particular embodiment of the invention, the aircraft's altimeter 60, flight management computer 70, and control panel 80 are all located in the Ownship aircraft's cockpit 90, and the external interface 30 is located outside of the aircraft's cockpit 90. For example, in one embodiment of the invention, the external interface 30 is located in a sturdy, tamperproof housing 12 within the Ownship aircraft's equipment bay 15. As is discussed in greater detail below, the external interface 30 is configured to receive information regarding the Ownship aircraft's altitude from the altimeter 60, information regarding the Ownship's aircraft's flight path and flight plan from the Flight Management Computer 70, and the Ownship aircraft's current flight ID and UAT configuration from the control panel 80.

GPS Engine

The aircraft information broadcasting system 10 further includes an internal GPS Engine 40, such as a Wide Area Augmentation System (WAAS) GPS Engine. This allows the aircraft information broadcasting system 10 to determine the latitude and longitude of the Ownship aircraft. In the alternative, the GPS Engine can be used to determine the altitude and three-dimensional position of the Ownship aircraft independently of other instrumentation within the Ownship aircraft.

Transmitter

As may be understood from FIG. 1, the aircraft information broadcasting system 10 includes a transmitter, such as a UAT Transmitter 50, for transmitting ADS-B information from the aircraft information broadcasting system 10 to various ground stations 100 or aircraft. Such information may include, for example, the Ownship aircraft's location information, altitude information, velocity information, waypoint information and intended course information.

ADS-B Processor

The ADS-B Processor (e.g., a LDPU Series ADS-B link and display processing unit from UPS Aviation Technologies) includes computer hardware and software, along with interfaces to the other components of the aircraft information broadcasting system 10. The ADS-B Processor implements necessary communication and control tasks that are performed by the ADS-B system.

Additional Components

In addition to the aircraft information broadcasting system described above, the Aircraft Surveillance System preferably comprises at least one ground station (GBT) 100 for receiving ADS-B signals from the aircraft information broadcasting system 10. As may be understood from FIG. 2, each ground station 100 is preferably connected to a ground computer 102, which is connected to the Air Traffic Control (ATC) computer network 104. Accordingly, the ground computer 102 is configured to receive ADS-B information from the Ownship aircraft via the GBT 100. As discussed in greater detail below, the ground computer 102 is further configured for receiving the Ownship's ATC approved clearances from the ATC network 104 and for automatically determining whether the Ownship aircraft has diverged substantially from the ATC approved clearances. For the purposes of this application, an "information reception and analysis station" may comprise at least one ground station 100 and at least one ground computer 102.

Applicable Technology

Technology for use in implementing the aircraft information broadcasting system 10 is available from multiple vendors including UPS Aviation Technologies, Inc. of Salem, Oreg., namely: (1) ADS-B link and display processing unit (LDPU) Model AT9000 (2) ADS-B ground based transceiver Model GBT2000; and (3) Model UAT Datalink.

Similarly, various components for use in this system are described generally in the following U.S. patents and patent applications, which are incorporated herein by reference: (1) U.S. Pat. No. 5,493,309 to Bjornholt, which issued on Feb. 20, 1991; and (2) published U.S. Patent Application 20020032528 to Lai, which was filed on Mar. 14, 2002.

Functionality of the Aircraft Surveillance System

In a preferred embodiment of the invention, the aircraft surveillance system continuously executes a surveillance module 200 while the Ownship aircraft 95 is airborne. As may be understood from FIG. 3, when executing the surveillance module 200, the system preferably first transmits, at step 210, intended course and related information (sometimes referred to as "intent") from the Ownship aircraft's flight management computer 70 to the aircraft information broadcasting system 10. Next, at step 220, the system optionally transmits UAT Control Information from the Control Panel 80 to the aircraft information broadcasting system 10. The system then proceeds to Step 230, where it transmits the altitude of the Ownship aircraft 95 from the altimeter 60 to the aircraft information broadcasting system 10. The system then advances to Step 240 where it uses the internal GPS engine 40 to determine the location, velocity, and (optionally) the altitude of the Ownship aircraft 95. As will be understood by one of ordinary skill in the art, while steps 210–240 above are described as occurring in a particular sequence, these steps may be executed in any other order or at the same time. Furthermore, one or more of Steps 210–230 may optionally be excluded from the surveillance module 200. This may be done, for example, in an embodiment of the invention in which the aircraft information broadcasting system 10 is autonomous in that it does not receive information from other aircraft control systems such as an altimeter 60, flight management computer 70, or control panel 80.

After completing steps 210–240, the system proceeds to step 250 where it uses the UAT transmitter 50 to transmit the Ownship aircraft's altitude information, location information, velocity information waypoint information and intended course information from the aircraft information broadcasting system 10 to the GBT 100. The system then transmits, at Step 260, the altitude information, location information, velocity information, waypoint information and intended course information from the GBT 100 to the Ground Computer 102. The system then advances to Step 270 where it uses the ground computer 102 to execute the Aircraft Information Analysis Module 300. The system then repeats Steps 210 through 270. In one embodiment of the invention, the system repeats Steps 210 through 270 substantially continuously while the Ownship aircraft 95 is in flight.

It should be understood that other embodiments of the invention may be configured to transmit greater or fewer items of information from the aircraft information broadcasting system 10 to the GBT 100 than detailed above. For example, in one embodiment of the invention, the system is only configured to transmit altitude information, location information, velocity information, and waypoint information from the GBT 100 to the Ground Computer 102.

As may be understood from FIG. 4, when executing the aircraft information analysis module 300, the system first executes step 310 where the ground computer 102 receives, from the ATC Computer Network 104, the ATC approved clearances that correspond to the Ownship aircraft's flight ID. Next, at step 320, the ground computer 102 compares the altitude, location, velocity, waypoint and intended course information that was received from the GBT 100 with the ATC approved clearances that correspond to the Ownship aircraft's flight ID. At step 330, the ground computer 102 then determines whether the altitude, location, velocity, waypoint, and intended course information that was received from the GBT 100 are each within a predetermined safety margin of the ATC approved clearances for the Ownship's current flight. If so, the system proceeds to Step 350 where it completes execution of the Aircraft Information Analysis Module 300. If not, the system proceeds to Step 340 where it issues an alarm indicating that the information transmitted from the Ownship aircraft does not comport with approved clearances. For example, the system may issue an alarm by sending an electronic message from the ground computer 102 to an air traffic controller or to a civil defense authority. Military aircraft can be equipped with a monitor that displays information that has been transmitted from the aircraft information broadcasting system 10 or the GBT 100. This information can help the pilots of the military aircraft track the Ownship aircraft 95.

Returning for a moment to Step 330, the safety margin for the various parameters received by the GBT is preferably chosen to minimize the occurrence of false alarms, and also to assure that the system detects any improper divergence from the ATC approved clearances early enough to take proper action. The system is preferably configured to allow a user to specify a different safety margin for each parameter. For example, the user may specify that if the Ownship aircraft's actual altitude is not within 5% of the approved altitude, the system should issue an alarm. Similarly, the user may specify that if the Ownship aircraft's actual velocity is not within 4% of the approved velocity, the system should issue an alarm. By the same token, the user may specify that if the intended course of the aircraft is substantially different from the ATC approved clearances, the system should issue an alarm. For example, the system is preferably configured to issue an alarm in response to the intended course of the aircraft and the ATC approved clearances differing by a pre-determined margin. In one embodiment of the invention, the system is configured to issue an alarm in response to the intended course of the aircraft differing from the aircraft's approved course by more than a predetermined number of nautical miles (e.g., 5 nautical miles).

A tracking file built in the ground computer 102 or the ATC network 104 can be used to predict a probable subsequent position and velocity for the aircraft. This predicted subsequent position and velocity may be compared to the position and velocity information received from the aircraft. If the predicted position and/or velocity differ from the received position and velocity information by more than a specified amount, the system preferably issues an alarm in the manner discussed above, or in any other suitable manner known in the art.

It should be understood that the modules executed by the ground computer 102 may alternatively be programmed into a computer within the ATC network 104.

Anti-Spoofing Features

In view of the fact that terrorists are becoming increasingly sophisticated in their methods of hijacking aircraft, it is useful to provide a system with anti-spoofing features. Such anti-spoofing features may be used, for example, to detect the presence of a false ADS-B signal that hijackers might transmit from a hijacked aircraft to deceive the system into perceiving that the aircraft is flying according to its approved flight plan when it is actually flying off course. One such anti-spoofing feature is based on the ability of ground-based systems to use well-known techniques based on signal propagation times to derive the distance between a particular ground station 100 and the UAT/ADS-B transmitter 50 within the aircraft information broadcasting system 10. The system may then compare this calculated "range value" with a range value that corresponds to the distance from the ground station to the Ownship's reported position. If these two range values do not agree within a predetermined safety factor, the system issues an appropriate alarm. This alarm may be used to alert the authorities that an false ADS-B signal is being transmitted from the aircraft.

As an additional validity check, the actual position of the Ownship aircraft 95 can be determined using well-known triangulation techniques, provided that multiple ground stations 100 receive at least a partial State Vector (identity plus altitude) of the Ownship aircraft 95. The Ownship aircraft's triangulated position can then be compared with the position that is transmitted from the Ownship aircraft 95 to a ground station 100 via the UAT transmitter. If these two position values do not agree within a predetermined safety factor, the system issues an appropriate alarm. This alarm may be used to alert the proper authorities that a false ADS-B signal is being transmitted from the aircraft.

As a further validity check, the actual position of the Ownship aircraft 95 can be calculated using well-known dead reckoning algorithms. This calculated position is then compared with the position that is transmitted from the Ownship aircraft 95 to a ground station 100 via the UAT transmitter. If these two position values do not agree within a predetermined safety factor, the system issues an appropriate alarm. This alarm may be used to alert the proper authorities that a false ADS-B signal is being transmitted from the aircraft.

Position Loss Considerations

In the event that the internal GPS engine 40 becomes unable to generate position information, the position of the Ownship aircraft 95 can be determined using well-known triangulation techniques, provided that multiple ground stations 100 receive at least a partial State Vector (identity plus altitude) of the Ownship aircraft 95. Alternatively, the system may use well-known dead-reckoning techniques to estimate the position of the Ownship aircraft 95. As shown in FIG. 5, the aircraft information broadcasting system 10 may include inexpensive measurement devices such as a magnetic flux gate 410, a solid state accelerometer 420, and a self-contained barometer 430 to assist in making such dead-reckoning calculations. These dead-reckoning calculations may also be used in Step 330 above to determine whether various system parameters are within predetermined safety margins of the ATC approved clearances for the flight.

Panic Button

Prior art systems allow pilots to enter a particular code within the aircraft navigation system to indicate that the aircraft is in danger of being hijacked. However, hijackers are often able to stop pilots from entering the code, or disable this functionality before an alert is sent to air traffic control. To solve this problem, the present system preferably includes a panic button within the cockpit of the aircraft that transmits a signal to the aircraft information broadcasting system 10 indicating that the Ownship aircraft 95 is in danger of being hijacked. The aircraft information broadcasting system 10 then immediately transmits a signal that triggers an appropriate alarm at the ground station 100. This aspect of the system is advantageous because it allows pilots to issue a distress signal without having to enter any sort of code, and because, due to the fact that the aircraft information broadcasting system is tamper-proof and preferably located outside of the aircraft's cockpit 90, it is unlikely that a hijacker would be able to disable the aircraft information broadcasting system before the pilot transmits a distress signal to air traffic control.

Ground Station Technical Considerations

The number of ground stations 100 needed for proper surveillance coverage may vary based upon the desired low altitude threshold for coverage. This is because line-of-site communication is required between the aircraft information broadcasting system 10 and the ground stations 100 that are receiving signals from the Surveillance Unit 10. The following chart gives some typical values for range vs. altitude.

| Altitude (AGL, feet) | Range (nmi) |
| --- | --- |
| 1,000 | 40 |
| 5,000 | 85 |
| 10,000 | 120 |
| 15,000 | 150 |

Based on the above chart, if coverage down to 1,000 feet above ground level (AGL) is desired, a ground station 100 would need to be installed every 40 to 80 miles, depending on how much overlap is desired to support the anti-spoofing and position-loss functionality described above. Assuming that every ground station 100 can cover a 40 nmi radius area on average, each base station site can provide surveillance over a 5,000 square mile area. With approximately 3.0 million square miles in the continental United States, approximately 600 ground station sites would be needed to cover the entire continental United States.

One embodiment of the invention comprises a hexagonal "cellular" grid of ground stations 100, spaced 100 nmi apart. This is estimated to give coverage down to 3,000 feet AGL. In this embodiment of the invention, each ground station 100 provides coverage over a 70 nmi radius, or 15,000 square miles. As will be understood by one skilled in the relevant technical field, the exact configuration of these ground stations 100 is determined taking into account various terrain-specific factors such as terrain blockages.

It should be understood that controller functions, the GBT 100, ground computer 102, and computers within the ATC computer network 104 may alternatively be airborne. For example, these components may be located within an AWACS aircraft rather than on the ground.

CONCLUSION

Many modifications and other embodiments of the invention will come to mind to one skilled in the art to which this invention pertains having the benefit of the teachings presented in the foregoing descriptions and the associated drawings. For example, it should be understood that, while the system is described as being to configured to transmit the Ownship aircraft's flight-related information in ADS-B format, the system may be configured to transmit this information in any other format known in the art. Accordingly, it should be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What I claim is:

1. An aircraft surveillance system for broadcasting information related to an aircraft, said aircraft surveillance system comprising:

an aircraft information broadcasting system that is positioned to prevent passengers of said aircraft from disabling said aircraft information broadcasting system, said aircraft information broadcasting system being configured for broadcasting flight-related information from said aircraft while said aircraft is in flight, and said flight-related information being related to a current flight of said aircraft.

2. The aircraft surveillance system of claim 1, wherein said aircraft information broadcasting system is configured for broadcasting said flight-related information in a substantially continuous manner while said aircraft is in flight.

3. The aircraft surveillance system of claim 2, wherein said aircraft information broadcasting system is configured for broadcasting said flight-related information in real time.

4. The aircraft surveillance system of claim 2, wherein said flight-related information comprises a current flight ID of said aircraft.

5. The aircraft surveillance system of claim 2, wherein said flight-related information comprises a current three-dimensional position of said aircraft.

6. The aircraft surveillance system of claim 2, wherein said flight-related information comprises a current velocity of said aircraft.

7. The aircraft surveillance system of claim 2, wherein said flight-related information comprises waypoint information for said aircraft.

8. The aircraft surveillance system of claim 2, wherein said flight-related information comprises current intent information for said aircraft.

9. The aircraft surveillance system of claim 1, wherein said aircraft information broadcasting system is disposed within a housing, said housing comprising a robust material that substantially surrounds said aircraft information broadcasting system and thereby restricts access to said aircraft information broadcasting system.

10. The aircraft surveillance system of claim 9, wherein said housing is configured to be locked while said aircraft is in flight.

11. The aircraft surveillance system of claim 9, wherein said aircraft surveillance system further comprises a power supply for providing an independent supply of power to said aircraft information broadcasting system, said power supply is being disposed within said housing.

12. The aircraft surveillance system of claim 9, further comprising a GPS receiver, wherein:

said GPS receiver is disposed within said housing; and said housing is configured for restricting access to said GPS receiver while said aircraft is in flight.

13. The aircraft surveillance system of claim 1, wherein said aircraft information broadcasting system configured for being disposed within a portion of said aircraft that is outside of a cockpit of said aircraft while said aircraft is in flight.

14. The aircraft surveillance system of claim 13, wherein said aircraft information broadcasting system is adapted to be mounted for use within an equipment bay of said aircraft.

15. The aircraft surveillance system of claim 1, wherein said aircraft surveillance system further comprises a power supply for providing an independent supply of power to said aircraft information broadcasting system.

16. The aircraft surveillance system of claim 15, wherein said power supply is a rechargeable battery.

17. The aircraft surveillance system of claim 15, wherein said power supply is configured to provide a supply of power to said aircraft information broadcasting system, said power supply being configured to not be interrupted while said aircraft is airborne.

18. The aircraft surveillance system of claim 1, further comprising a GPS receiver that is positioned to be inaccessible by the passengers and crew of said aircraft while said aircraft is in flight.

19. The aircraft surveillance system of claim 1, wherein said aircraft information broadcasting system comprises an ADS-B transmitter.

20. The aircraft surveillance system of claim 1, wherein said aircraft information broadcasting system includes an external interface for receiving flight plan information from a flight management computer of said aircraft.

21. The aircraft surveillance system of claim 1, wherein said aircraft information broadcasting system further comprises a magnetic flux gate, an accelerometer, and a barometer.

22. The aircraft surveillance system of claim 1, further comprising a ground station that is configured for receiving said flight-related information.

23. The aircraft surveillance system of claim 22, wherein:

said flight-related information includes intent information for said aircraft; and said aircraft surveillance system comprises an information reception and analysis station that is configured for comparing said intent information with approved flight path information for said aircraft to determine whether said aircraft is being directed toward an improper destination.

24. The aircraft surveillance system of claim 23, wherein said information reception and analysis station is configured for receiving said approved flight path information from one or more air traffic control computers.

25. The aircraft surveillance system of claim 23, wherein said aircraft surveillance system is configured for generating an alarm if said intent information differs from said approved flight path information by more than a predetermined amount.

26. The aircraft surveillance system of claim 22, wherein:

said flight-related information includes a current three-dimensional position of said aircraft and said aircraft surveillance system comprises an information reception and analysis station that is configured for comparing said current three-dimensional position with approved flight path information to determine whether said aircraft is being directed toward an improper destination.

27. The aircraft surveillance system of claim 26, wherein said aircraft surveillance system is configured for generating an alarm if said three-dimensional position information differs by more than a predetermined amount from a predicted three-dimensional position that is based upon said approved flight path information.

28. The aircraft surveillance system of claim 1, further comprising a panic button disposed within said aircraft, and wherein said aircraft surveillance system is configured, in response to said panic button being selected by a user, to broadcast a signal indicating that said aircraft is in danger.

29. The aircraft surveillance system of claim 28, wherein said aircraft information broadcasting system is configured, in response to said panic button being selected by a user, to broadcast a signal indicating that said aircraft is in danger.

30. The aircraft surveillance system of claim 1, wherein said aircraft surveillance system is configured for validating messages received from said aircraft.

31. The aircraft surveillance system of claim 1, wherein:

said aircraft surveillance system comprises an information reception and analysis station, said information reception and analysis station being configured to validate aircraft information received from said aircraft information broadcasting system by determining an estimated range based on a signal propagation time and comparing said estimated range with a calculated range that is derived from aircraft information received from said aircraft information broadcasting system.

32. The aircraft surveillance system of claim 31, wherein said aircraft surveillance system is configured for generating an alarm if said estimated range differs from said calculated range by more than a predetermined amount.

33. The aircraft surveillance system of claim 1, further comprising an information reception and analysis station, said information reception and analysis station being configured to use triangulation techniques to validate information received from said aircraft information broadcasting system.

34. The aircraft surveillance system of claim 1, wherein said aircraft surveillance system comprises an information reception and analysis station, said information reception and analysis station being configured for using a dead-reckoning algorithm to validate a signal which is represented as corresponding to a particular three-dimensional position of said aircraft, said signal being received from said aircraft information broadcasting system.

35. The aircraft surveillance system of claim 34, wherein said information and analysis station is configured for using a dead-reckoning algorithm to determine whether said signal is valid by performing the steps of:
  using a dead-reckoning algorithm to estimate a first three-dimensional position of said aircraft, said first three-dimensional position of said aircraft corresponding to a first point in time;
  using a dead-reckoning algorithm to estimate a second three-dimensional position of said aircraft, said second three-dimensional position of said aircraft corresponding to a second point in time;
  using said first three-dimensional position and said second three-dimensional position to determine an estimated model value for said particular three-dimensional position of said aircraft; and
  comparing said estimated model value for said particular three-dimensional position of said aircraft with said particular three-dimensional position of said aircraft.

36. The aircraft surveillance system of claim 35, wherein said information and analysis station is configured for generating an alarm in response to said model value for said particular three-dimensional position of said aircraft differing from said particular three-dimensional position of said aircraft by more than a predetermined amount.

37. The aircraft surveillance system of claim 1, wherein said aircraft surveillance system comprises an information reception and analysis station, said information reception and analysis station being configured for using a dead-reckoning algorithm to validate a current velocity of said aircraft, said current velocity being received from said aircraft information broadcasting system.

38. The aircraft surveillance system of claim 37, wherein said information and analysis station is configured for using said dead-reckoning algorithm to validate a current velocity of said aircraft by performing the steps of:
  using a dead-reckoning algorithm to estimate a first three-dimensional position of said aircraft, said first three-dimensional position of said aircraft corresponding to a first point in time;
  using a dead-reckoning algorithm to estimate a second three-dimensional position of said aircraft, said second three-dimensional position of said aircraft corresponding to a second point in time;
  using said first three-dimensional position and said second three-dimensional position to estimate a projected velocity of said aircraft; and
  comparing said projected velocity of said aircraft with a current velocity of said aircraft received from said aircraft information broadcasting system.

39. The aircraft surveillance system of claim 38, wherein said step of using a dead-reckoning algorithm to validate a current velocity of said aircraft comprises the step of generating an alarm if said projected velocity of said aircraft differs from a current velocity of said aircraft received from said aircraft information broadcasting system by more than a predetermined amount.

40. The aircraft surveillance system of claim 1, wherein said aircraft information broadcasting system is configured so that potential hijackers cannot shut down or otherwise hinder the operation of said aircraft information broadcasting system.

41. The aircraft surveillance system of claim 1, wherein said aircraft information broadcasting system is configured to be tamperproof.

42. The aircraft surveillance system of claim 1, wherein said aircraft information broadcasting system is positioned to prevent the crew of said aircraft from disabling said aircraft information broadcasting system.

43. An aircraft surveillance system for tracking an aircraft, said aircraft surveillance system comprising:
  an aircraft information broadcasting system disposed within said aircraft, said aircraft information broadcasting system being configured for broadcasting flight-related information in a substantially uninterruptible manner while said aircraft is in flight, said flight-related information being related to a current flight of said aircraft.

44. The aircraft surveillance system of claim 43, wherein said flight-related information comprises a flight ID of said aircraft.

45. The aircraft surveillance system of claim 43, wherein said flight-related information comprises current intent information for said aircraft.

46. The aircraft surveillance system of claim 43, wherein said flight-related information comprises a current three-dimensional position of said aircraft.

47. The aircraft surveillance system of claim 43, wherein said flight-related information comprises a current velocity of said aircraft.

48. The aircraft surveillance system of claim 43, wherein said flight-related information comprises waypoint information for said aircraft.

49. The aircraft surveillance system of claim 48, wherein:
  said flight-related information comprises a flight ID of said aircraft;
  said flight-related information comprises current intent information for said aircraft;
  said flight-related information comprises a current three-dimensional position of said aircraft; and
  said flight-related information comprises a current velocity of said aircraft.

50. A method of broadcasting information related to an aircraft, said method comprising the steps of:
  providing an aircraft information broadcasting system, said aircraft information broadcasting system being configured for broadcasting flight-related information from said aircraft while said aircraft is in flight;

positioning said aircraft information broadcasting system within said aircraft to prevent passengers of said aircraft from disabling said aircraft information broadcasting system; and using said aircraft information broadcasting system to broadcast said flight-related information from said aircraft.

51. The method of claim 50, wherein said step of using said aircraft information broadcasting system to broadcast said flight-related information is performed in a substantially continuous manner while said aircraft is in flight.

52. The method of claim 50, wherein said flight-related information comprises a current three-dimensional position of the aircraft.

53. The method of claim 50, wherein said flight-related information comprises a current velocity of said aircraft.

54. The method of claim 50, wherein said flight-related information comprises waypoint information for said aircraft.

55. The method of claim 50, wherein said flight-related information comprises said aircraft's current intent information.

56. The method of claim 50, further comprising the step of providing a ground station that is configured for receiving said flight-related information.

57. The method of claim 50, wherein said flight-related information includes intent information for said aircraft, and further comprising the step of:

comparing said intent information with approved flight path information to determine whether said aircraft is being directed toward an improper destination.

58. The method of claim 50, wherein said flight-related information includes a current three-dimensional position of said aircraft, and further comprising the step of:

comparing said current three-dimensional position with approved flight path information to determine whether said aircraft is being directed toward an improper destination.

59. The method of claim 58, further comprising the step of generating an alarm in response to said current three-dimensional position differing from a predicted three-dimensional position by more than a predetermined amount.

60. The method of claim 50, further comprising the steps of:

using a dead-reckoning algorithm to estimate a first three-dimensional position of said aircraft for a first point in time;

using a dead-reckoning algorithm to estimate a second three-dimensional position of said aircraft for a second point in time;

using said first three-dimensional position and said second three-dimensional position to estimate a projected velocity of said aircraft; and comparing said projected velocity of said aircraft with a reported current velocity of said aircraft that is received from said aircraft information broadcasting system.

61. The method of claim 50, wherein said step of positioning said aircraft information broadcasting system comprises positioning said aircraft information broadcasting system to prevent the crew of said aircraft from disabling said aircraft information broadcasting system.

62. A method of tracking an aircraft comprising the steps of:

providing an aircraft with an information broadcasting system, said aircraft information broadcasting system being configured for broadcasting information related to a current flight of said aircraft in a substantially uninterruptible manner while said aircraft is in flight.

63. The method of claim 62, wherein said flight-related information comprises current intent information for said aircraft.

64. The method of claim 62, wherein said flight-related information comprises a current three-dimensional position of said aircraft.

* * * * *